Jan. 18, 1949. H. E. CARNAGUA ET AL 2,459,361
TORQUE RESPONSIVE CLUTCH
Filed June 26, 1943 5 Sheets-Sheet 1

Inventors:
Harold E. Carnagua
Clifford L. Swift
By Edward C. Kritzbaugh
Atty.

Jan. 18, 1949. H. E. CARNAGUA ET AL 2,459,361
TORQUE RESPONSIVE CLUTCH
Filed June 26, 1943 5 Sheets-Sheet 2
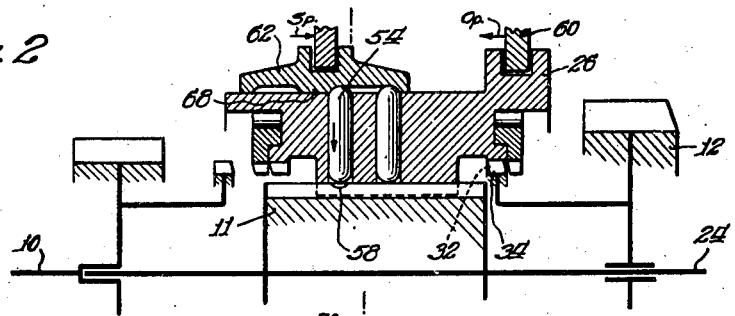
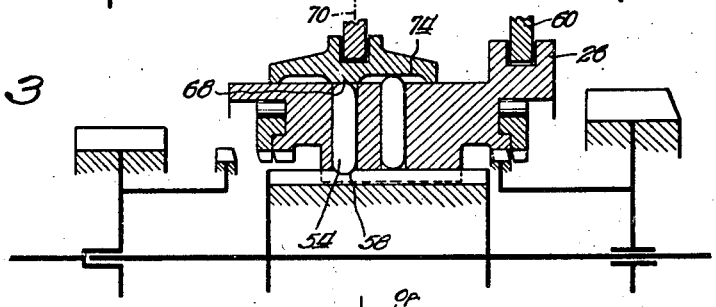
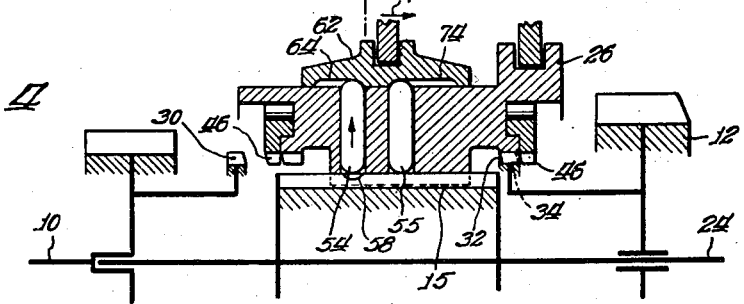
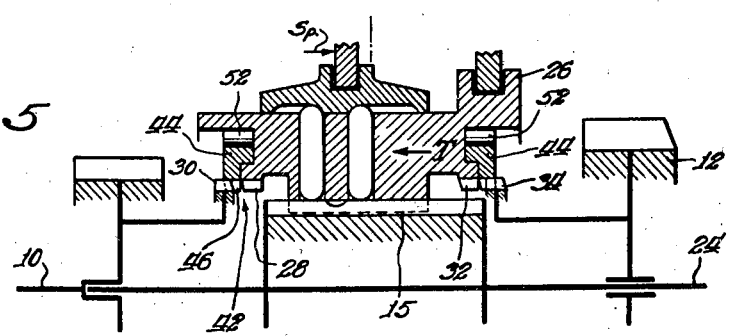

Jan. 18, 1949.  H. E. CARNAGUA ET AL  2,459,361
TORQUE RESPONSIVE CLUTCH
Filed June 26, 1943  5 Sheets-Sheet 3

Inventors:
Harold E. Carnagua
Clifford L. Swift
By Edward C. Fitzbaugh
Atty.

Jan. 18, 1949.                H. E. CARNAGUA ET AL                2,459,361
                                TORQUE RESPONSIVE CLUTCH
Filed June 26, 1943                                            5 Sheets-Sheet 4
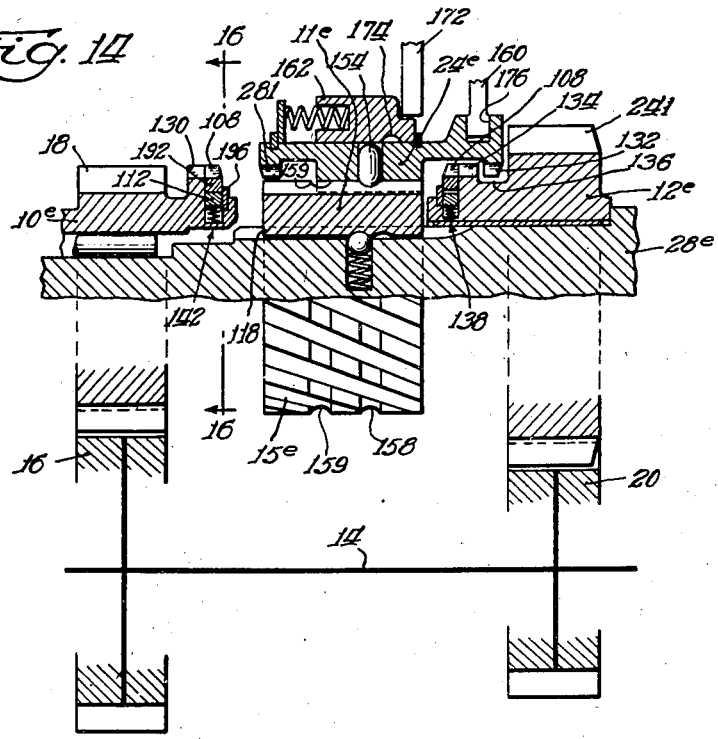
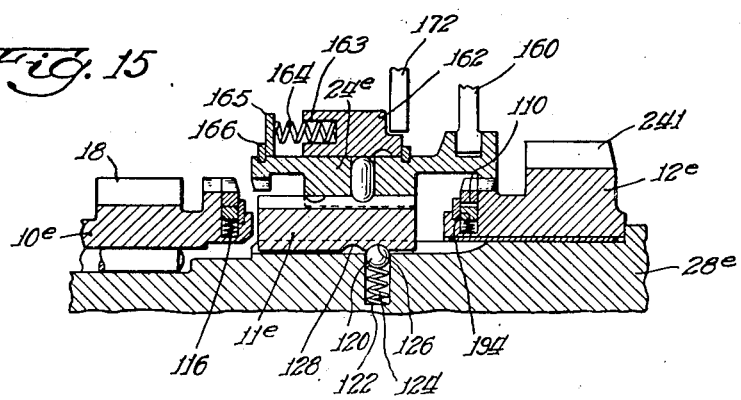
Inventors:
Harold E. Carnagua
Clifford L. Swift
By Edward C. Fitzhaugh
Atty.

Jan. 18, 1949.  H. E. CARNAGUA ET AL  2,459,361
TORQUE RESPONSIVE CLUTCH
Filed June 26, 1943  5 Sheets-Sheet 5
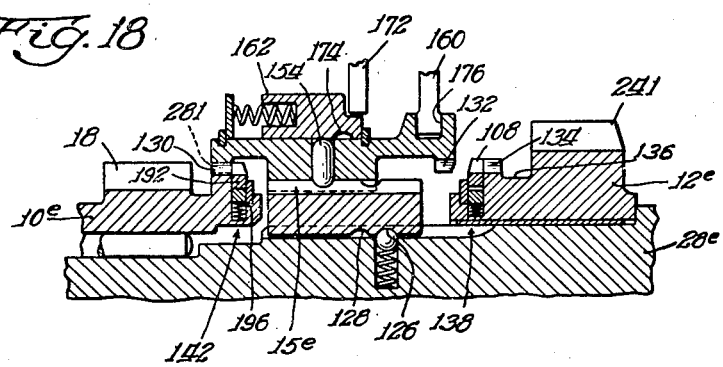
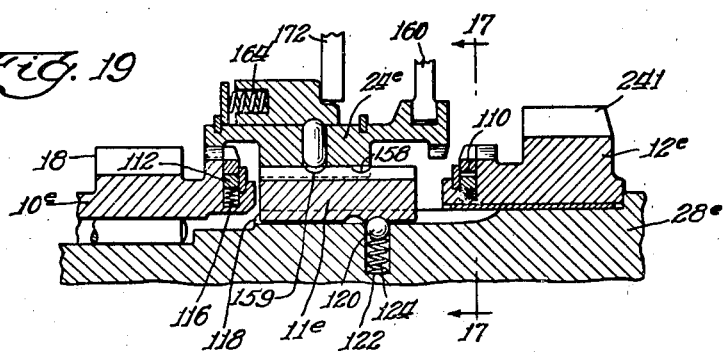
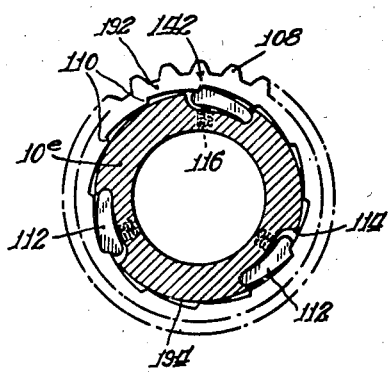
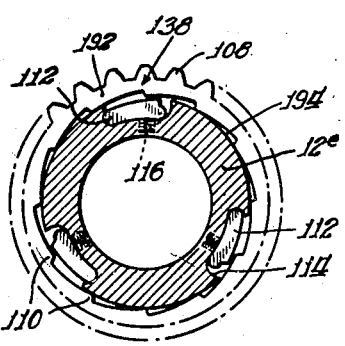
Inventors:
Harold E. Carnagua
Clifford L. Swift
By: Edward C. Fitzhugh
Atty.

Patented Jan. 18, 1949

2,459,361

UNITED STATES PATENT OFFICE 2,459,361

TORQUE RESPONSIVE CLUTCH

Harold E. Carnagua and Clifford L. Swift, Muncie, Ind., assignors to Borg-Warner Corporation, Chicago, Ill., a corporation of Illinois Application June 26, 1943, Serial No. 492,378

16 Claims. (Cl. 192—48)

This invention relates to coupling devices and has as its general object to provide a positive coupling device adapted to be employed, in connection with suitable controls, for effecting an automatic shift between adjacent gear ratios in a transmission in which the gearing may be generally of a conventional type and in which other shifts may be operator energized.

The manually shifted three speed transmission employed in present day automobiles employs an integral, axially shiftable positive clutch member which is adapted to be selectively coupled to either of two driving members that are constantly geared together for rotation at different speeds. The driving ratios thus established are adjacent to each other, for example, second speed and direct drive. In addition to its two driving positions, the clutch member has a neutral or non-driving position in which it is unclutched from both of the driving members. Manual shifting mechanism is linked directly to the shiftable clutch member for shifting it to either of its driving positions or to its neutral position. The present invention contemplates an arrangement wherein a single clutch member, having two driving positions and a neutral position, is adapted for torque responsive shifting between the driving positions and for manual shifting from the neutral position to one of the torque responsive positions, the manual shifting being effected by directly coupled operator controlled shifting mechanism which is adapted for free movement with the clutch member in the torque responsive shifting thereof.

A further object of the invention is to provide a clutch mechanism in which, in addition to the foregoing characteristics, the shiftable clutch member is not torque responsive in the neutral position i. e. wherein the shift between the neutral position and the driving position is not affected by the torque responsive mechanism. Another object is to provide a clutch mechanism adapted, in a transmission of the type indicated, to effect a shift between two adjacent drive ratios without passing through a neutral position or otherwise breaking the driving connection between the engine and the driven shaft. The invention further aims to provide a clutch mechanism wherein the shift from neutral to the lower speed position of the two driving positions established by the shiftable clutch member may be made without passing through another drive position. To the attainment of these several objects, the invention provides an arrangement wherein the neutral position is adjacent the lower speed position of the two positions established by the shiftable clutch member, and remote from the higher speed position, wherein the torque responsive mechanism is in the line of drive so as to be subject to torque action only when the shiftable clutch member is in or between one of two driving positions established thereby, and wherein means is provided for maintaining overrunning drive connections between the driving and driven members during the shifting movement of the clutch member between the two driving positions.

Another object of the invention is to provide a clutch mechanism wherein the means for maintaining the drive connections also functions to synchronize the shiftable clutch member to whichever coacting drive member it is approaching.

A further object of the invention is to provide a clutch mechanism which, in addition to the feature set forth above, embodies means for locking out the shiftable clutch member in the higher speed position so that the control mechanism (such as the engine throttle control) which is employed for controlling the torque responsive shift, may be manipulated within normal driving limits without reacting on the torque responsive mechanism, and wherein, by manipulating the control outside of the normal driving range (as by moving the throttle beyond full open position) the operator may restore the torque responsive action for down-shifting from the higher to the lower ratio position.

These and other objects and features of this invention will become apparent from the following specification when taken together with the accompanying drawings in which:

Fig. 2 is a schematic representation of the clutch mechanism in the transition to the second speed ratio position;

Fig. 3 is a similar view showing the clutch locked in the second speed position;

Fig. 4 is a similar view showing the clutch in an early stage of the torque responsive shift between the second speed and direct drive positions;

Fig. 5 is a similar view showing the clutch in a later state of the torque responsive shift between second speed and direct drive;

Fig. 14 is an axial sectional view of a clutch mechanism embodying a modified form of the invention, shown in the neutral position;

Fig. 15 is a similar view of the clutch mechanism shown in the second speed position;

Fig. 16 is a transverse sectional view taken on the line 16—16 of Fig. 14, showing the direct drive synchronizer in synchronizing position;

Fig. 17 is a transverse sectional view taken on the line 17—17 of Fig. 19, showing the second speed synchronizer in an overrunning position;

Fig. 18 is an axial sectional view of the clutch mechanism in the direct drive position; and Fig. 19 is a similar view of the clutch mechanism in the beginning stage of the down-shift from the direct drive to the second speed position.

Figure 1:
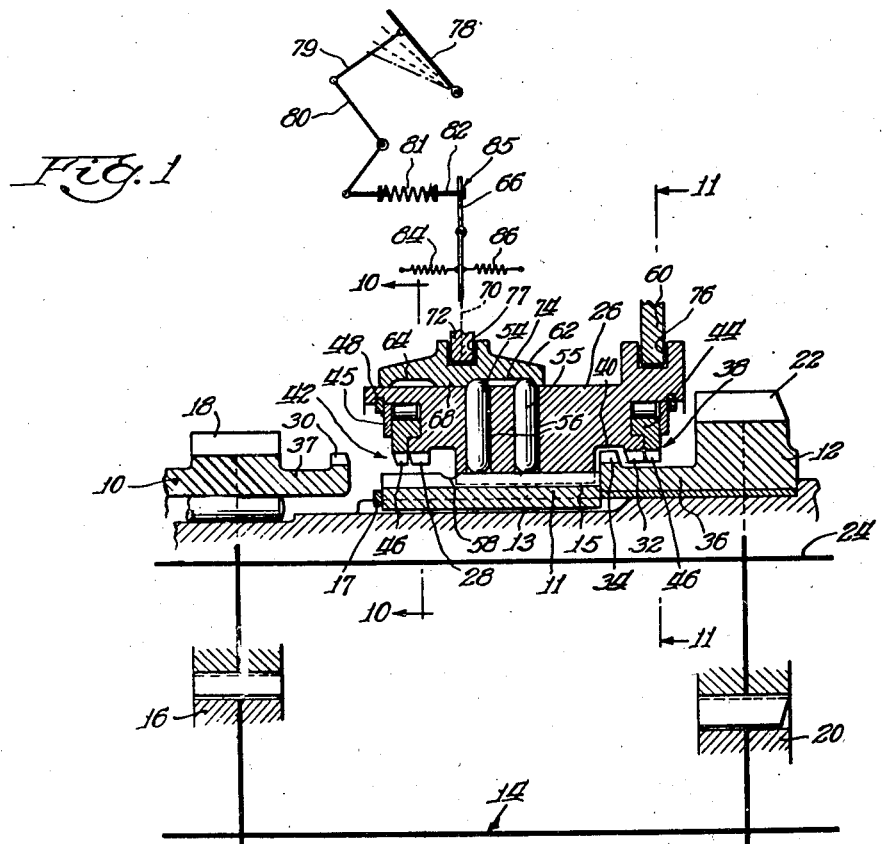
Fig. 1 is an axial sectional view of a clutch mechanism embodying the invention, shown in the neutral position.

As an example of one form in which the invention may be embodied, we have shown in Figs. 1 to 13 inclusive a jaw clutch or coupling device adapted for use in a conventional countershaft constant mesh gearing arrangement in which a direct drive coupling member 10 is geared to a reduced ratio drive coupling member 12 through a countershaft 14 (shown schematically) having a gear 16 meshing with a gear 18 on the driving member 10 and a gear 20 meshing with the gear 22 on the second speed member 12. A driven shaft 24, on which the second speed drive member 12 is rotatably mounted, is adapted to be selectively clutched to the direct drive member 10 (or to the second speed drive member 12) by means of a shiftable jaw clutch sleeve or coupling member 26. The clutch member 26 has a driving connection with the driven shaft 24 through a hub 11 which is splined to the shaft 24 as at 13, and is confined against axial movement by the end of the driving member 12 and a snap ring 17 mounted in the shaft 24. The clutch member 26 is provided at its respective ends with internal clutch teeth 28 and 32 adapted to mesh with clutch teeth 30 on the direct drive member 10 or with clutch teeth 34 on the second speed member 12 in order to establish direct drive or second speed ratio respectively.

Torque responsive shift of the clutch member 26 (indicated in the various views by arrows labeled "T") is effected by a helically splined connection 15 between the hub 11 and the clutch member 26, and this splined connection 15 thus constitutes a torque responsive shifting means. The direction of the splines are such that the clutch member 26 will shift toward the direct drive member 10 when a decelerating load is transmitted to it from the driving members while the hub 11 is being driven forwardly under a coast torque from the driven shaft 24, and will shift toward the second speed driving member 12 when it is being driven forwardly by the driving members.

The drive teeth 30 and 34 are connected to their respective drive members 10 and 12 by reduced diameter necks 37 and 36 respectively, the neck 36 being adapted to bridge the teeth 32 of the shiftable clutch member 26 when the latter is in the neutral position. The teeth 32 are spaced from the body of the clutch member 26 by an annular channel 40 which receives the clutch teeth 34 in the neutral position. For synchronizing the shiftable clutch member 26 with the drive member toward which it is being shifted, and for maintaining potential driving connections between the driving members and the shiftable clutch member during the shift, we provide synchronizers 38 and 42, each comprising a synchronizer ring 44 mounted in an annular channel defined between an end surface of the clutch member 26 and a washer 45 abutted against a snap ring 48 mounted in the clutch member 26. Each synchronizer ring 44 is formed with a plurality of inwardly extending teeth 46 alignable with the clutch teeth 32 and 28 respectively. The clutch member 26 is provided at each end with a set of internal ratchet teeth 51. Ratchet rollers 52 are normally received in pockets 53 in the synchronizer ring and adapted to be cammed outwardly thereby into engagement with the ratchet teeth 51. When a ratchet is thus engaged, its teeth 46 will be aligned with the teeth 32 (or 28), permitting the clutch member 26 to be shifted freely into mesh with the teeth 34 (or 30).

For locking the clutch member 26 in its drive positions, we provide a pair of series of circumferentially spaced locking bolts 54 and 55 radially slidable in radial bores 56 in the clutch member 26 and adapted to engage in an annular groove 58 in the periphery of the hub 11. The bolts 54 and 55 are controlled by a locking collar 62 which has an internal annular groove 64 adapted to receive the bolts 54 and an internal annular groove 74 adapted to receive both series of bolts 54 and 55 simultaneously, in order to permit the bolts to disengage from the groove 58. The grooves 64 and 74 are separated by a land 68 which, when aligned with one series of bolts, functions to hold the same in the groove 58 so as to lock the clutch member 26 against axial shifting movement.

Figure 7:
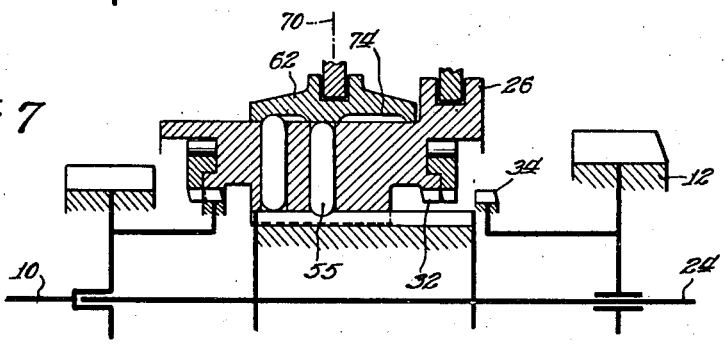
Fig. 7 is a similar view showing the clutch locked in the direct drive position.

The clutch member 26 is locked in the second speed position by the bolts 54 and in the direct drive position by the bolts 55, as shown in Figs. 3 and 7 respectively.

The locking collar 62 is urged by balanced spring pressure (indicated in the various views by arrows labeled "Sp.") toward a fixed central position indicated by the broken line 70, and is adapted to be shifted to either side of this position (as indicated by arrows labeled "Op.") by operator controlled means such as the shift yoke 72, connected to a lever 66 and engaging in a channel 77 in the locking collar 62. The invention contemplates the operation of the yoke 72 by the engine throttle control or accelerator pedal 78 in such a manner that movement of the accelerator pedal to or beyond fully closed throttle position will result in shifting the collar 62 to the right of its centered position and movement of the accelerator pedal 78 to or beyond fully open throttle position will result in movement of the collar 62 to the left of its centered position, as viewed in the drawings. Any suitable linkage for accomplishing this result may be employed, for example, the rod 79, bell crank lever 80, coil spring 81 and rod 82, the latter having a lost motion connection, indicated at 85, with the lever 66, which will permit a normal range of accelerator operation in which accelerator movement is not transmitted to the locking collar 62.

Any suitable means for yieldingly urging the collar 62 toward a centered position may be employed, for example, a pair of springs 84 and 86 acting in opposite directions on the lever 66 and balancing each other. The springs 84 and 86 are anchored to some fixed member in order that the centered position of the collar 62 may be a fixed one. The spring 81 is sufficiently heavy to dominate the spring 86, but in turn is dominated by the conventional retractor spring of the pedal 78. The parts are so arranged that when the collar 62 is locked to the clutch sleeve 26 in its centered position 70, and the pedal 78 is in its fully retracted position shown in full lines in Fig. 1, the spring 81 will be tensioned just sufficiently to move the collar 62 substantially to its position shown in Fig. 4 when the collar is unlocked.

For manual shifting of the clutch member 26 from its neutral position to its second speed position, we provide a channel 78 in the clutch member 26, adapted to receive a shift yoke 60. The yoke 60 constitutes operator controlled means for shifting the clutch member 26 between these two positions and may be connected to suitable operator energized means for moving the yoke which may be of a conventional type.

The operation of the clutch mechanism may best be explained by starting with the neutral position shown in Fig. 1 and proceeding through the various stages of shifting movement shown in the ensuing schematic views.

In the neutral position, the locking bolts 54 and 55 are both disengaged from the groove 58 and received in the internal groove 74 of the collar 62, the latter being in its centered position. The collar 62 is locked to the clutch member 26 by the bolts 54 and 55, and the lever 66 is thereby fixed in its centered position as shown. In the fully retracted position of the accelerator pedal, shown in full lines, the spring 81 will be under tension. In the shift from neutral to second speed, the yoke 60 is shifted manually to the left as viewed in the drawings, meshing the clutch teeth 32 with the second speed drive teeth 34. Being locked to the clutch member 26, the collar 62 will be shifted therewith against the pull of the springs 86 and 81 until it reaches about the position shown in Fig. 2, whereupon the bolts 54, which now register with the groove 58 in the hub 11, will be cammed inwardly by the collar 62 tending to move toward the right under the spring tension as indicated in Fig. 2, and as soon as the bolts have thus been moved inwardly, the collar 62 will shift to the right. Upon moving the accelerator pedal 78 to the initial throttle opening position indicated by the upper broken line in Fig. 1, the collar 62 will then assume its centered position in which the land 68 engages the bolts 54 to lock them in the groove 58 as shown in Fig. 3. Thus the clutch member 26 is locked in the second speed drive position.

The shift fork 60 is left free to shift with the sleeve 26 in the torque responsive shifting thereof.

In the shift from the second speed position to the direct drive position, the accelerator pedal 78 is allowed to move to its fully retracted position. This movement is transmitted through the lever 66 to shift the collar 62 to the position (shown in Fig. 4) in which the bolts 54 are registered with the internal groove 64 of the collar so that they may move outwardly under centrifugal force to release their locking engagement in the groove 58, while the bolts 55 are still accommodated in the internal groove 74. The pedal 78 is then moved to the initial throttle opening position in order to provide slack in the connection 85 sufficient to permit the collar 62 to return to the centered position and the clutch sleeve 26 to shift to the left. The closing of the throttle imposes a deceleration load on the driving members 10 and 12, which is transmitted to the clutch member 26 through the second speed drive teeth 34 and the clutch teeth 32. The forward coast torque which will thus be established in the driven shaft 24 will react through the helically splined connection 15 against the deceleration load on the clutch member 26 so as to move the latter to the left toward the direct drive position until the clutch teeth 32 are disengaged from the clutch teeth 34, the second speed synchronizer teeth 46 are meshed with the clutch teeth 34, and the direct drive synchronizer teeth 46 are meshed with the direct drive teeth 30, as shown in Fig. 5.

Figure 10:
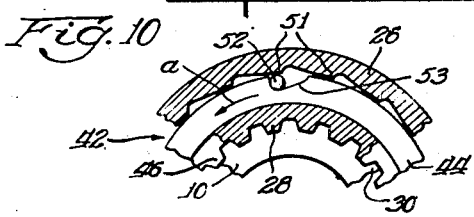
Fig. 10 is a transverse sectional view taken on the line 10—10 of Fig. 1 of the direct drive synchronizer, shown in an overrunning position.
Figure 11:
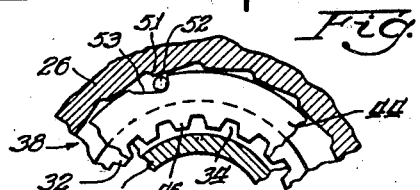
Fig. 11 is a transverse sectional view taken on the line 11—11 of Fig. 1, showing the second speed synchronizer in an overrunning position.
Figure 12:
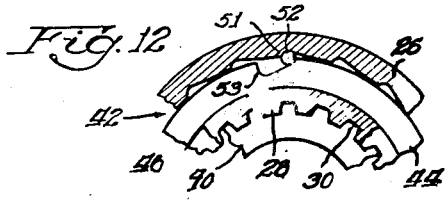
Fig. 12 is a transverse sectional view showing the direct drive synchronizer in the direct drive position.
Figure 6:
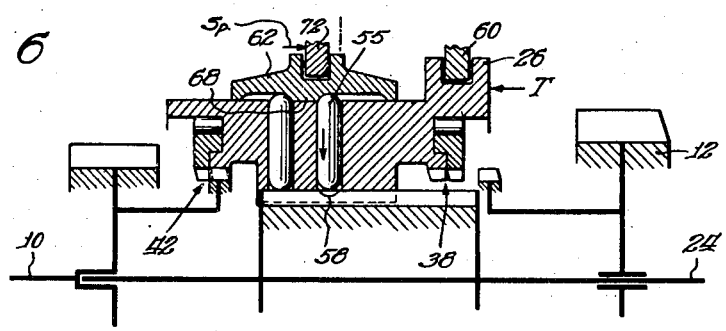
Fig. 6 is a similar view showing the clutch in a still later stage of a shift from second speed to direct drive position.

Immediately upon engagement of the direct drive synchronizer teeth 46 with the teeth 30, the direct drive synchronizer will commence to overrun as shown in Fig. 10, the teeth 51 of the slower moving clutch member 26 being overrun by the synchronizer ring 44 which is clutched to the faster rotating direct drive member 10, as indicated by the arrow a in Fig. 10. As soon as the second speed clutch teeth 32 and 34 are completely disconnected, the deceleration load on the second speed drive member 12 will cause the latter to commence to lag behind the driven shaft 24 and clutch member 26, whereupon, as indicated in Fig. 11, the ratchet teeth 51 of the clutch member 26 will overrun the second speed synchronizer ring 44 which is clutched to the second speed drive member 12. While both synchronizers are overrunning, the torque reaction will be interrupted and the clutch member 26 will pause in its axial movement. However, potential driving connections are maintained through the respective synchronizers, and as soon as the speed of the direct drive member 10 has decelerated to that of the clutch member 26, and the latter commences to rotate ahead of the drive member 10, the rollers 52 of the direct drive synchronizer 42 will be cammed outwardly by the camming pockets 53 into positive engagement with the ratchet teeth 51, aligning the direct drive synchronizer teeth 46 with the direct drive clutch teeth 28, restoring the torque reaction in the helically splined connection 15, and thereby continuing the movement of the clutch member 26 to the left until the teeth 30 and 28 are fully meshed as shown in Fig. 6.

The torque responsive shifting movement of the clutch member 26 toward the direct drive position is transmitted through the locking bolts 55 to the locking collar 62, moving the latter with the clutch member 26 as indicated by the arrows in Fig. 5, and tensioning the spring 86. As the direct drive position is closely approached, the bolts 55 will be moved into the groove 58 by the camming action of the collar 62 under the pull of spring 86, and as soon as the bolts are thus fully engaged the collar 62 will return to its centered position in which the land 68 engages the outer ends of the bolts 55 and locks the bolts in the groove 58 so as to lock the clutch member 26 in the direct drive position as shown in Fig. 7.

Figure 13:
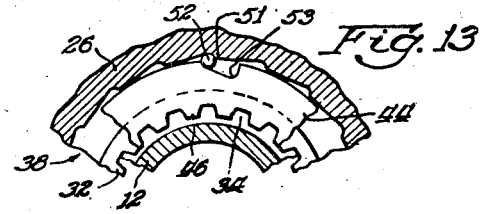
Fig. 13 is a transverse sectional view of the second speed synchronizer shown in the second speed drive position.
Figure 8:
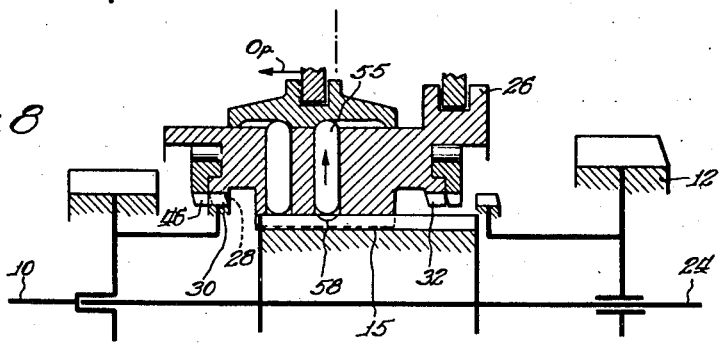
Fig. 8 is a similar view showing the clutch in the beginning of the down-shift from direct drive to second speed.

Down-shifting from the direct drive to the second speed position is effected by moving the accelerator pedal 78 beyond full open throttle position, such movement being transmitted through the linkage 80, 81, 82, 85, 72 to the collar 62 to move the latter to the left of its centered position as shown in Fig. 8. Simultaneously, under the accelerator opening movement, an accelerating forward torque will be established on the driving members 10 and 12 which, transmitted through the direct drive clutch teeth 30 and 28 to the clutch member 26, will react in the helically splined connection 15 against the load on the driven shaft 24 to bias the clutch member 26 toward the second speed position, tending to force the bolts 55 out of the groove 58 as indicated in Fig. 8. The accelerator pedal will then be retracted to the full open throttle position, permitting the collar 62 to move to the right with the clutch member 26 to which it is now latched. The clutch member 26 will shift to the intermediate ratcheting position of Fig. 5, will then pause, with both synchronizers overrunning, while the speed of the drive member 12 is accelerated to that of the clutch member 26, whereupon the second speed synchronizer will positively engage as shown in Fig. 13, the teeth 46 thereof will be aligned with the second speed clutch teeth 32, transmission of torque through the synchronizer from the direct drive member 12 to the clutch member 26 will be established, restoring the torque reaction, and the clutch member 26 will then shift to the second speed drive position shown in Fig. 9, in which the teeth 32 and 34 are fully meshed.

Figure 9:
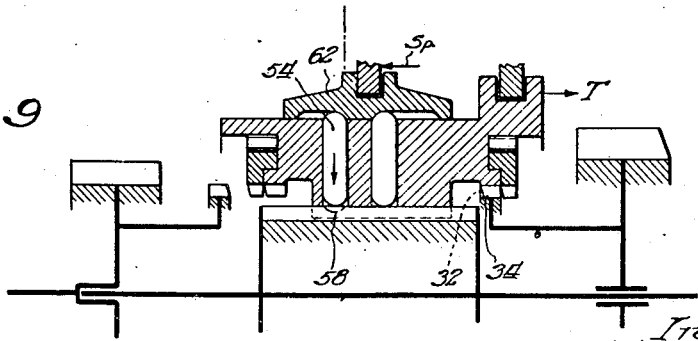
Fig. 9 is a similar view showing the clutch in a later stage of the down-shift.

In the second stage of torque reactive shift, thrust will be transmitted from the clutch member 26 to the locking collar 62 through the bolt 54, moving the collar 62 to the right of its centered position and tensioning spring 84, as shown in Fig. 9. As the bolts 54 register with the groove 58 at the end of the torque responsive shift, they will be forced into the groove 58 by the spring-urged return of the collar 62 to its centered position.

In the form of the invention shown in Figs. 14 to 19 inclusive, the clutch sleeve 24e is splined upon a hub 11e by helical splines 15e. The helical splines like those in the other embodiment of the invention constitute a torque responsive shifting means. The sleeve is locked in either of its drive positions by lock-in mechanism comprising locking elements 154 adapted to engage in either of two grooves 158 and 159 in the periphery of the hub 11e, and a locking collar 162 adapted to engage the locking element 154 and hold it in engagement with a respective groove 158 or 159. Yielding means in the form of coil springs 164 are compressed between a washer 165 and the collar 162, being seated in bores 163 in the latter. The washer 165 is abutted against a snap ring 166 seated in the sleeve 24e. The coil springs 164 urge the collar 162 toward its locking position. An operator controlled shift fork 172 is adapted to engage the collar 162 to move it to the unlocking position wherein a recess 174 in the collar 162 registers with the locking element 154 and permits the latter to move out of the recess 158 or 159. An operator controlled shift fork 160, operating in an annular channel 176 in the sleeve 24e, is employed for manually shifting the sleeve from neutral position, shown in Fig. 14, to the second speed position, shown in Fig. 15 and vice versa.

The second speed clutch teeth 134 are spaced from the second speed gear 241 to provide an annular space 136 in which the clutch teeth 132 are accommodated in the neutral position. The second speed ratchet 138, for synchronizing the shift from direct drive to second speed, is carried by the second speed drive member 12e on the opposite side of the teeth 134 from the channel 136, whereby the clutch teeth 132 may immediately engage the teeth 134 in the shift from neutral to second speed.

The direct drive synchronizing ratchet 142 is carried by the direct drive member 10e. Each of the synchronizing ratchets 138 and 142 comprise a ratchet ring 192 mounted in an annular channel 194 in the respective driving member and retained therein by a snap ring 196. Each ratchet ring 192 is provided with peripheral clutch teeth 108 adapted to be aligned with the adjacent clutch teeth 134 and 130 respectively of the driving members, and internal ratchet teeth 110 adapted to be engaged by pawls 112 mounted in recesses 114 in the respective driving members, communicating with the channels 194. The pawls 112 are urged outwardly by compression springs 116 mounted in the respective driving members.

The hub 11e is slidably mounted on the driven shaft 28e through the medium of a straight axially extending splined connection 118. Poppet balls 120, mounted in bores 122 in the driven shaft 28e are urged outwardly by springs 124 into engagement with one of two grooves 126 and 128 in the hub member 11e, thus determining two axially spaced positions of the hub member 11e. The right hand position determined by engagement of the balls 120 in the groove 128 (Fig. 14) corresponds to the neutral position of the clutch, and the left hand position of the hub, determined by engagement of the balls 120 in the groove 126, is maintained while the sleeve 24e is in either of the driving positions and during shifting between those positions.

The shift sleeve 24e is moved from the neutral to the second speed position by means of the fork 160, which is thereafter left free to move with the clutch sleeve 24e in the torque reaction shifting of the latter between the two drive positions. The intermediate region of the clutch member 24e is sufficiently thick to dispose the splined connection 15e radially inwardly of the clutch teeth 132 and 281 in order that the latter teeth may clear the splined connection in the neutral position of the clutch. As the result of the thickness of the intermediate region of the sleeve 24e, the locking elements 154 are bean-shaped.

The helically splined connection 15e is rendered inoperative by locking the jaw member 24e to the hub 11e directly across the splined connection, by the engagement of the locking elements 154 in either the recesses 158 or the recesses 159 of the hub 11e.

In the operation of the clutch shown in Figs. 14 to 19 the shift from neutral to second speed position is effected by moving the shift sleeve 24e manually to the left by means of the fork 160. The sleeve 24e is locked to the hub 11e by the locking element 154 and locking collar 162, and the hub 11e will be moved with the clutch sleeve 24e until the poppet balls 120 rest in the groove 126, whereupon the clutch will be in the second speed position as shown in Fig 15. The fork 160 is then left free to shift with the sleeve 24e during the torque responsive shifting thereof.

The shift from second speed to direct drive is effected by moving the locking collar 162 to the left against the compression of the springs 164, and simultaneously decelerating the driving member 12e. The movement of the collar 162 to the left is continued until the recess 174 therein registers with the locking element 154 whereupon the decelerating torque of the driving member 12e, transmitted through the teeth 132 and 134 and reacting in the splined connection 15e, will urge the sleeve 24e toward the left, forcing the locking elements 154 out of the recesses 158 of the hub 11e and into the recesses 174, and freeing the sleeve 24e for movement to the left. The sleeve 24e will then shift to the left, disengaging the teeth 132 from the second speed drive clutch teeth 134 and engaging them with the clutch teeth 108 of the ratchet 138 while the clutch teeth 281 mesh with the teeth 108 of the ratchet 142. The clutch sleeve 24e will then pause, both synchronizers ratcheting while the driving member 10e decelerates to the speed of the driven member, whereupon the ratchet 142 will establish a drive from the driving member 10e to the clutch sleeve 24e, reestablishing the torque reaction and causing the teeth 281 to move into full clutching engagement with the teeth 130, said teeth having been lined up by the ratchet 142. When this position is reached, the locking elements 154 will register with the recess 189 in the hub 11e, and as soon as the pressure of the shift member 172 on the locking collar 162 is released, the spring 164 will shift the collar 162 to the right, forcing the locking element 154 out of the recess 174 and into the recess 159, thus again locking the sleeve 24e to the hub 11e, and rendering the helically splined connection inoperative.

The downshift from direct drive to second speed is effected by again shifting the locking collar 162 to the left to unlock the jaw member 24e from the hub 11e, and simultaneously accelerating or maintaining driving torque on the drive members 10e and 12e, whereupon the clutch member 24e will shift to the right in a manner that is believed to be obvious from the foregoing description, and when full clutching engagement of the teeth 132 and 134 is reestablished, the locking collar 162 will again be permitted to shift back to the right under the pressure of the spring 164, again locking the sleeve 24e to the hub 11e.

It will now be apparent that in both the upshift and the downshift between second and direct drive, the locking collar 162 is forcibly moved to the left and held there long enough to permit the torque responsive shift to take place, and then permitted to return to its locking position. It will also be apparent that this movement of the locking collar may be readily coordinated with the movement of the throttle by suitable linkage between the throttle and the shift fork 172, so that the lock release may be accomplished at either extremity of throttle movement. The shift fork 160, on the other hand, may be moved under independent manual control, as in the other form of the invention.

While we have described our invention in connection with specific embodiments thereof it is to be understood that this is by way of illustration and not by way of limitation and the scope of our invention is defined solely by the appended claims which should be construed as broadly as the prior art will permit.

We claim:

1. In a coupling device, a pair of coupling members, one rotatable relative to the other, adapted for positive coupling connection with each other, at least one of said coupling members being shiftable to effect said connection, torque responsive means for shifting said shiftable coupling member into and out of said connection in response to torque transmitted therethrough in opposite directions, and operator controlled shift means connected with said shiftable coupling member for moving the same from a non-torque responsive position to a position from which said shiftable coupling member may shift torque responsively, said shift means being adapted for free movement with said shiftable coupling member during torque responsive shifting thereof.

2. In a coupling device, in combination with a pair of members, one rotatable relative to the other, a coupling member adapted for positive coupling connection with one of said members and having a driving connection with the other member permitting it to shift axially to establish said coupling connection, means carried by said coupling member and adapted to lock the same in said coupling connection, and means connected directly to said coupling member for shifting the same and with it said locking means.

3. A coupling device as defined in claim 1, including means for locking the shiftable coupling member in its coupling position.

4. A coupling device as defined in claim 1, including means carried by the shiftable coupling member and adapted to lock the same in its coupling position, means acting between the coupling member and said locking means and biasing the latter toward its locking position, and operator controlled means for moving said locking means to an unlocking position wherein said shiftable coupling member is released for uncoupling movement.

5. In a jaw clutch, in combination with a pair of coaxial rotatable members to be coupled, a jaw clutch sleeve having a torque responsive connection with one of said members adapted to shift it axially into positive coupling engagement with the other member, a radially shiftable locking element, a locking collar encircling said jaw clutch sleeve and adapted to engage said locking element and to maintain the same in a position wherein it locks said jaw clutch sleeve in said coupling engagement, yielding means acting between said collar and said jaw clutch sleeve and constantly biasing said collar toward its locking position, operator controlled means for shifting said locking collar against the resistance of said yielding means to an unlocking position wherein it permits said locking element to shift radially to release said jaw clutch sleeve for shifting movement, and operator controlled means coupled directly to said jaw clutch sleeve and adapted for shifting the latter from a non-torque responsive position to a position from which it may move torque responsively, said last means being adapted to be freed for movement with said clutch sleeve in the torque responsive movement of the latter.

6. In a positive coupling, in combination with a pair of members, one rotatable relative to the other, and a third member, rotatable relative to said pair of members, coupling means adapted for positive coupling connection with either member of said pair of members and having a torque responsive driving connection with said third member adapted, under torque transmitted therethrough in opposite directions, to move said coupling means respectively into and out of coupling connection with one member of said pair of members, manually releasable means for locking said coupling means in said coupling connection, and operator controlled means coupled directly to said coupling means and adapted for free movement therewith in the torque responsive shifting thereof, said last means being adapted for moving said coupling means from a non-torque responsive position to a position from which it may move torque responsively.

7. In a synchronizing clutch, in combination with three coaxial rotatable torque transmitting members, including a pair of driving members rotatable relative to each other and each having a set of clutch teeth, means for selectively coupling either of said driving members to the third of said members constituting the driven member, said means comprising a clutch member having teeth adapted to be coupled selectively to either of said sets of clutch teeth, means drivingly connecting said clutch member to said driven member and adapted, under torque transmitted therethrough in one direction, to move said clutch member into couple with one of said sets of teeth and in response to torque transmitted therethrough in the other direction to move the clutch member into couple with the other set of teeth, a pair of sets of ratchet pawls, each set being adapted to be placed in operative registry with a set of clutch teeth toward which said clutch element is being moved torque responsively as the clutch element disengages the other set of clutch teeth and, upon a reversal of the direction of relative rotation between the driven member and said driving member toward which the clutch element is moving, to engage said set of clutch teeth with which it is registered, to arrest said relative rotation, to position the teeth of said clutch element for coupling with the adjacent set of clutch teeth, and to restore the transmission of torque through said connecting means for moving said clutch element into coupling engagement with said adjacent set of clutch teeth, means for automatically locking said clutch element in one of its coupling positions, upon arrival at said one position, operator-controlled means for moving said locking means into a position freeing said clutch element for torque-responsive movement, and operator-controlled means for moving said clutch element from a neutral, non-coupled position to the other of said coupling positions, said last-mentioned means being coupled directly to said clutch member and adapted for free movement therewith in the torque responsive shifting thereof.

8. In a positive coupling, in combination with a pair of members, one rotatable relative to the other, and a third member, rotatable relative to said pair of members, a coupling member adapted for positive coupling connection with either member of said pair of members and having a torque responsive driving connection with said third member adapted, under torque transmitted therethrough in opposite directions, to move said coupling member into coupling connection with the respective members of said pair, manually releasable means for locking said coupling member in one coupling position, and manually operable means, connected directly to the coupling member and adapted for free shifting movement therewith in the torque responsive shifting thereof, for shifting said coupling member from a non-coupled, non-torque responsive position to the other of said coupled positions.

9. In a positive coupling, in combination with three coaxial rotatable torque transmitting members including a pair of driving members rotatable relative to each other, a coupling member adapted for positive coupling connection with either of said members, means connecting said coupling member to the third of said torque transmitting members and adapted, in response to transmission of torque therethrough in opposite directions, to shift said coupling member respectively into coupling connection with one or the other member of said pair of driving members, operator releasable means for locking said coupling member in the higher speed coupling position, and operator controlled means for shifting said coupling member from a neutral position disposed adjacent the lower speed coupling position and remote from the higher speed coupling position to said lower speed coupling position, said last means being adapted for free shifting movement with said coupling member in the torque responsive shifting thereof.

10. In a synchronizing clutch, in combination with three coaxial rotatable torque transmitting members including a pair of driving members rotatable relative to each other and each having a set of clutch teeth, means for selectively coupling either of said driving members to the third of said members constituting the driven member, said means comprising a clutch member having teeth adapted to be coupled selectively to either of said sets of clutch teeth, means drivingly connecting said clutch member to said driven member and adapted, under torque transmitted therethrough in one direction, to move said clutch member into couple with one of said sets of teeth and in response to torque transmitted therethrough in the other direction to move the clutch member into couple with the other set of teeth, a pair of sets of ratchet pawls each adapted to be placed in operative registry with a set of clutch teeth toward which said clutch member is being moved torque responsively as the clutch member disengages the other set of clutch teeth, and upon a reversal of the direction of relative rotation between the driven member and said driving member toward which the clutch member is moving, to engage said set of clutch teeth with which it is registered, to arrest said relative rotation, to position the teeth of said clutch member for coupling with the adjacent set of clutch teeth, and to restore the transmission of torque through said connecting means for moving said clutch member into coupling engagement with said adjacent set of clutch teeth, operator releasable means for automatically locking said clutch element in its higher ratio coupling position, and operator controlled means for shifting said clutch member from a neutral, non-torque responsive position to the lower ratio coupling position from which it may move torque responsively, said neutral position being disposed adjacent said lower speed position and remote from the higher speed position, and said ratchet teeth being adapted to permit the coupling member to move through the lower speed position in passing from the neutral position to the higher speed position.

11. In a coupling device, a pair of coupling members, one rotatable relative to the other, adapted for positive coupling connection with each other, at least one of said coupling members being shiftable to effect said connection, torque responsive means for shifting said shiftable coupling member into and out of said connection in response to torque transmitted therethrough in opposite directions, operator releasable means for automatically locking said coupling member in said connection, comprising a locking element mounted in said coupling member, a locking collar for controlling said locking element, said collar encircling said coupling element and axially shiftable relative thereto, means biasing said collar toward a fixed position, said biasing means being yieldable to permit said collar to move on either side of said fixed position, and operator energized means for shifting said collar against the resistance of said biasing means.

12. A coupling device as defined in claim 11 in combination with an engine throttle control and connections from said control to said locking collar adapted to move said collar in one direction upon complete retraction of said control in throttle closing direction and to move said collar in the opposite direction in response to movement of said control to the limit of its possible movement in throttle opening direction.

13. In a positive coupling, in combination with a pair of relatively rotatable members, a coupling member adapted for positive coupling connection with one member of said pair of members, a drive member connecting said coupling member to the other member of said pair of members, said drive member having an axially shiftable driving connection with said other member and a torque responsive driving connection with said coupling member adapted in response to the transmission of torque therethrough in opposite directions, to shift said coupling member into and out of said coupling connection, means for yieldably latching said drive member to said other member in either of two axially spaced positions in one of which said coupling member is carried in a non-torque responsive position and in the other of which said coupling member may shift torque responsively.

14. A positive coupling as defined in claim 13, including operator releasable means for automatically locking said coupling member to said drive member in either coupled or uncoupled relation to said one member.

15. A positive coupling as defined in claim 13, including operator releasable means for automatically locking said coupling member to said drive member in either coupled or uncoupled relation to said one member and operator controlled means, connected directly to said coupling member, for shifting the latter and with it said drive member, from said non-torque responsive position to said torque responsive position.

16. In a positive coupling, in combination with a pair of members, one rotatable relative to the other, and a third member rotatable relative to said pair of members, a coupling member adapted for positive coupling connection with either member of said pair of members and having a torque responsive driving connection with said third member adapted, under torque transmitted therethrough in opposite directions, to move said coupling member into coupling connection with the respective members of said pair, operator releasable means for automatically locking said coupling member in either of its coupled positions, comprising a pair of locking bolts mounted in axially spaced positions in said coupling member for radial shifting movement, and a recess in said third member in which either of said bolts is adapted to make locking engagement, a locking collar encircling said coupling member and adapted to move one or the other of said bolts into said recess depending upon the axial position of said clutch member, means biasing said locking collar toward a fixed, centered position, said biasing means being yieldable to permit said locking collar to move a limited distance on either side of said centered position, and operator controlled means for shifting said collar against the resistance of said biasing means.

HAROLD E. CARNAGUA.
CLIFFORD L. SWIFT.

REFERENCES CITED

The following references are of record in the file of this patent:

UNITED STATES PATENTS

| Number | Name | Date |
|---|---|---|
| 1,379,891 | Aichele | May 31, 1921 |
| 1,719,881 | Farmer | July 9, 1929 |
| 1,862,188 | Legge | June 7, 1932 |
| 2,072,058 | Ranen | Feb. 23, 1937 |
| 2,110,964 | Ridgeway | Mar. 15, 1938 |
| 2,202,271 | Sinclair et al. | May 28, 1940 |
| 2,208,674 | Jessen | July 23, 1940 |
| 2,224,322 | Sinclair | Dec. 10, 1940 |
| 2,232,090 | Anderson | Feb. 18, 1941 |
| 2,245,017 | Sinclair | June 10, 1941 |
| 2,248,133 | Snow | July 8, 1941 |
| 2,258,475 | Sinclair | Oct. 7, 1941 |
| 2,320,757 | Sinclair et al. | June 1, 1943 |
| 2,322,479 | Schyolin | June 22, 1943 |
| 2,335,255 | Banker | Nov. 30, 1943 |
| 2,371,564 | Wemp | Mar. 13, 1945 |

FOREIGN PATENTS

| Number | Country | Date |
|---|---|---|
| 86,613 | Switzerland | May 19, 1919 |
| 321,186 | Italy | Sept. 26, 1943 |